(12) United States Patent
Obayashi

(10) Patent No.: US 10,811,905 B2
(45) Date of Patent: Oct. 20, 2020

(54) POWER TRANSMISSION DEVICE, VEHICLE, AND WIRELESS POWER TRANSMISSION DEVICE

(71) Applicant: KABUSHIKI KAISHA TOSHIBA, Minato-ku, Tokyo (JP)

(72) Inventor: Shuichi Obayashi, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 65 days.

(21) Appl. No.: 16/290,898

(22) Filed: Mar. 2, 2019

(65) Prior Publication Data
US 2019/0348862 A1 Nov. 14, 2019

(30) Foreign Application Priority Data
May 14, 2018 (JP) .................. 2018-093293

(51) Int. Cl.
*H02J 50/10* (2016.01)
*B60L 53/12* (2019.01)
*H02J 7/02* (2016.01)
*H01F 27/36* (2006.01)
*H02J 50/90* (2016.01)
*B64F 1/36* (2017.01)
*H01F 38/14* (2006.01)

(52) U.S. Cl.
CPC .............. *H02J 50/10* (2016.02); *B60L 53/12* (2019.02); *B64F 1/362* (2013.01); *H01F 27/365* (2013.01); *H01F 38/14* (2013.01); *H02J 7/025* (2013.01); *H02J 50/90* (2016.02); *B60L 2200/10* (2013.01)

(58) Field of Classification Search
CPC ........ B64F 1/362; H01F 27/365; H01F 38/14; B60L 53/12; B60L 2200/10; H02J 50/10; H02J 7/025
See application file for complete search history.

(56) References Cited

U.S. PATENT DOCUMENTS

| | | | |
|---|---|---|---|
| 9,527,605 B1* | 12/2016 | Gentry | B64F 1/12 |
| 2017/0117676 A1* | 4/2017 | James | B64C 39/024 |
| 2018/0056794 A1* | 3/2018 | Kim | B60L 53/126 |
| 2018/0233007 A1* | 8/2018 | Williams | A61P 13/12 |
| 2019/0344679 A1* | 11/2019 | Miller | B60L 8/003 |

FOREIGN PATENT DOCUMENTS

| | | |
|---|---|---|
| JP | 2005278318 A | 10/2005 |
| JP | 2017135880 A | 8/2017 |

* cited by examiner

*Primary Examiner* — Jared Fureman
*Assistant Examiner* — Duc M Pham
(74) *Attorney, Agent, or Firm* — Holtz, Holtz & Volek PC

(57) ABSTRACT

According to one embodiment, a power transmission device including a housing for landing a vehicle, and a ferromagnetic material and a power transmission coil. An outer shape of a cross-section of the housing becomes larger from a top of the housing toward a bottom of the housing, the outer shape is a non-true circle, and the outer shape is similar to an inner shape of a frame provided in the vehicle. The ferromagnetic material is within the housing, the ferromagnetic material being continuous in an up-and-down direction of the housing. The power transmission coil is within the housing, the power transmission coil being configured to surround the ferromagnetic material.

14 Claims, 19 Drawing Sheets

POWER TRANSMISSION DEVICE, VEHICLE, AND WIRELESS POWER TRANSMISSION DEVICE

CROSS REFERENCE TO RELATED APPLICATIONS

This application is based upon and claims the benefit of priority from the prior Japanese Patent Application No. 2018-093293, filed on May 14, 2018, the entire contents of which are incorporated herein by reference.

FIELD

Embodiments described herein relate to a power transmission device, a vehicle, and a wireless power transmission device.

BACKGROUND

Vehicles, such as drones, are operated using mounted batteries as their driving sources, and fly the air. In order to enable long-distance movement of a vehicle, there is a method of charging a battery at relay points in a route, or charging the battery at a destination point.

As a wireless feed system that wirelessly feeds a landed drone at a ground station, the following is known. In this system, a magnetic plate for receiving power is provided in the ground station (ground surface) and a protruding object tapered toward its tip is provided on the magnetic plate for receiving power. Then, a power transmission coil is provided at the tip of the protruding object. On the other hand, a power reception coil having a larger diameter than the size of a ground part of the protruding object is provided in a leg of the drone. The drone lands on the ground from above the station such that the power reception coil contacts the magnetic plate. In this state, wireless feeding is performed from the power transmission coil of the station to the power reception coil. However, when the diameter of the power reception coil is too large with respect to the size of the ground part of the protruding object, there is a possibility that a position misalignment occurs. On the other hand, when the diameter of the power reception coil is too small, the power reception coil will be separated from the magnetic plate for receiving power. As described above, when the position misalignment occurs, or when the power reception coil is separated from the magnetic plate for receiving power, a sufficient electromagnetic induction phenomenon is not obtained, and efficient wireless feeding cannot be performed.

Additionally, a charging device has been proposed that charges a ring-like instrument housing a coil to be charged in a ring-shaped frame. A shoulder portion of a housing of a cone is formed with a shape having a gently expanded diameter, and a coil for charging is provided inside the shoulder portion. When the ring-like instrument is placed in the housing, the ring-shaped frame is locked by the shoulder portion, and in this state, power transmission is wirelessly performed from the coil for charging to the coil to be charged. However, depending on the size of the ring-shaped frame, the distance between this frame and the coil for charging becomes large. In this case, a sufficient coupling coefficient between the coils is not obtained, and a sufficient electromagnetic induction phenomenon cannot be obtained. Additionally, there is a high possibility that the direction of placement is displaced at the time of placement of the ring-like instrument. When the direction is shifted, a sufficient electromagnetic induction phenomenon is not obtained, and efficient wireless feeding cannot be performed. Further, in a vehicle such as a drone, when the direction of placement is shifted, a position misalignment with a device for checking the state of a vehicle mounting devices, such as a camera and a sensor, will occur at a landing place, and appropriate inspection will be prohibited.

DETAILED DESCRIPTION

Figure 1A:
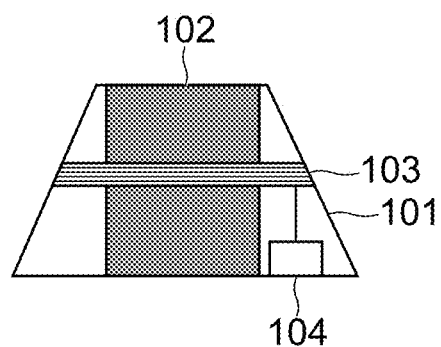
FIGS. 1A and 1B show a power transmission device according to a first embodiment.

According to one embodiment, a power transmission device including a housing for landing a vehicle, and a ferromagnetic material and a power transmission coil. An outer shape of a cross-section of the housing becomes larger from a top of the housing toward a bottom of the housing, the outer shape is a non-true circle, and the outer shape is similar to an inner shape of a frame provided in the vehicle. The ferromagnetic material is within the housing, the ferromagnetic material being continuous in an up-and-down direction of the housing. The power transmission coil is within the housing, the power transmission coil being configured to surround the ferromagnetic material.

Hereinafter, embodiments of the present invention will be described with reference to the drawings. In the drawings, the same numerals are given to the same or equivalent elements, and a description thereof will be properly omitted.

First Embodiment

Figure 1B:
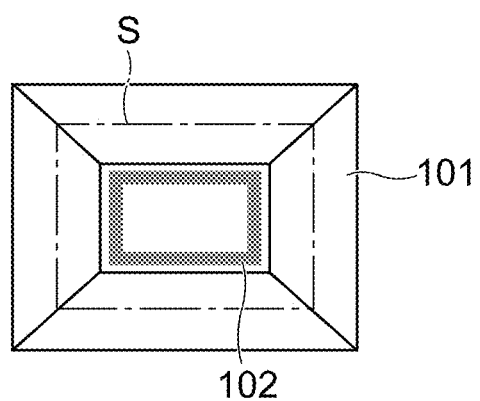
Figure 2B:
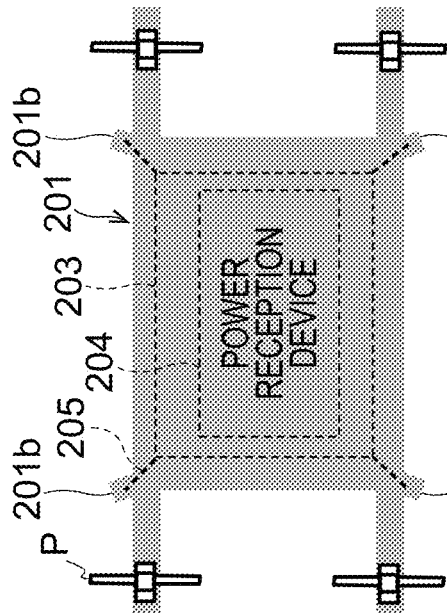
FIGS. 2A to 2D show a vehicle according to the first embodiment, and its components.
Figure 2D:
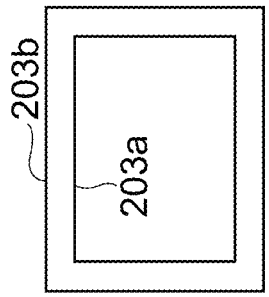
Figure 2A:
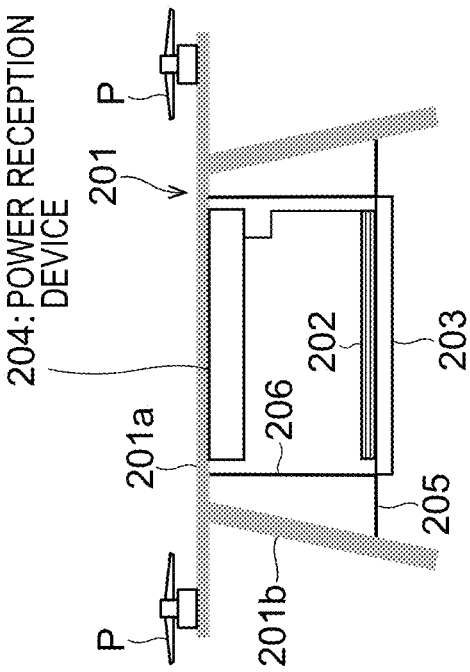

FIGS. 1A and 1B show a power transmission device according to a first embodiment. FIGS. 2A and 2B show a vehicle according to the first embodiment. The vehicle in FIGS. 2A to 2D is a vehicle that moves in the air, on the ground surface or the like. The vehicle is, for example, a drone, a radio control airplane, or a radio control helicopter. In the following description, it is assumed that the vehicle is a drone. Hereinafter, first, the vehicle in FIGS. 2A to 2D will be described, and thereafter, the power transmission device in FIGS. 1A and 1B will be described.

Figure 2C:
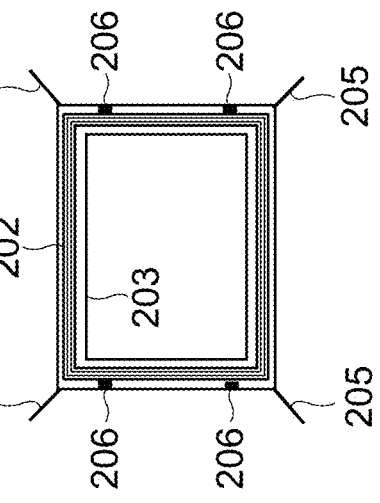

FIG. 2A is a side view of a drone, which is a vehicle. FIG. 2B is a top view of the drone in FIG. 2A. FIG. 2C is a top view showing a frame 203, a power reception coil 202, etc. of the drone, which are removed from the drone, and FIG. 2D is a top view showing the frame 203 of the drone.

The drone in FIG. 2A includes a drone body 201, the frame 203, the power reception coil 202 mounted on the frame 203, and a power reception device 204 used in response to power received by the power reception coil 202.

A body frame of the drone body 201 includes a top plate 201a and legs 201b. The body frame is mainly made of a non-metallic material (for example, carbon, plastic, a mixture of carbon and plastic, etc.). However, a part (a coupling part, a thread, etc.) of the body frame may be made of a metallic material. The power reception device 204 is arranged on a rear surface of the top plate 201a. The power reception device 204 includes a power reception circuit that wirelessly receives power from a power transmission device via the power reception coil 202, and a load (electric instrument) that uses the power received by the power reception circuit. The electric instrument is, for example, a storage battery (rechargeable battery) or an instrument that consumes power. The storage battery is a secondary battery, such as a lithium ion battery. As examples of a device that consumes power, there are a motor that drives a rotary wing (rotor) of a drone, a control device that controls driving of the motor, and a computer that controls movement. A rotary wing (rotor) P driven by a motor is provided in four corners of the drone body 201.

The frame 203 is arranged under the power reception device 204. As shown in FIG. 2D, the frame 203 is a circular frame having an inner shape 203a of a non-true circle shape. In the example of FIGS. 1A and 1B, the inner shape 203a of the frame 203 is a rectangle. An outer shape 203b is also a rectangle in which the ratio between a shorter side and a long side is generally equal to that of 203a. The frame 203 is generally parallel to the top plate 201a. Additionally, the inside of the frame 203 is hollow. Accordingly, it is possible to reduce the weight of the frame 203. Note that the configuration that the inside of the frame 203 is hollow is an exemplary configuration, and the inside may not be hollow. The frame 203 is made of a non-metallic material (for example, carbon, plastic, a mixture of carbon and a plastic, etc.). However, it does not eliminate that a material other than a non-metallic material is included in the frame 203.

The frame 203 is supported by a plurality of (four, in the shown example) support members 206 such that the frame 203 is hung from the top plate 201a. Additionally, the frame 203 is fixed to the legs 201b of the body frame by a plurality of (four, in the shown example) support members 205, and accordingly, the frame 203 is also supported from the sides. Accordingly, the frame 203 is fixed to the drone body 201.

The frame 203 is provided with the power reception coil 202. As shown in FIG. 2C, in an upper surface of the frame 203, the power reception coil 202 is wound along the loop of the frame 203 (that is, wire of the power reception coil 202 is wound along the shape of the frame 203). The power reception coil 202 is fixed to the frame 203 by an arbitrary fixing means, such as a binding band or an adhesive. It is also possible to adopt a configuration in which the power reception coil 202 is wound along a loop in the hollow part of the frame 203. Further, it is also possible to adopt a configuration in which a hollow tube, etc. is mounted in a non-hollow frame and the power reception coil 202 is wound around inside of this tube, etc. In these two cases, the power reception coil 202 can be protected from the outside. The power reception coil 202 is connected to the power reception device 204 via wiring.

FIG. 1A shows a side view of a power transmission device, and FIG. 1B shows a top view of the power transmission device. The power transmission device is installed in a port, such as a drone port provided on the ground surface. In the side view of FIG. 1A, a power transmission coil 103 and a ferromagnetic material ferromagnetic material 102 in a housing 101 are transparently displayed.

The power transmission device includes the housing 101 for drone placement (hereinafter referred to as the housing), the ferromagnetic material 102, the power transmission coil 103, and a power transmission circuit 104.

The housing 101 is installed in a port, such as a drone port. The outer shape of a cross-section of the housing 101 becomes larger from the top toward the bottom, and the outer shape of the cross-section is a non-true circle. The upper part of the housing 101 is opened. In the figure, as an example, the housing 101 is a truncated four-sided pyramid, and the outer shape S of the cross-section at an arbitrary height is a rectangle. The housing 101 has a sloped shape that is linearly spread. The housing 101 is made of a non-metallic material (for example, carbon, plastic, a mixture of carbon and a plastic, glass, a mixture of glass fiber and plastic, FRP, etc.) as an example. The housing 101 may be formed by a tabular member having a generally constant thickness, or may be a three-dimensional integral configuration. The housing 101 allows the drone to land thereon for charging. The drone is placed at a position for charging of the housing 101 by engaging the loop of the frame 203 of the drone with the housing 101. On this occasion, since the outer shape of the cross-section of the housing 101 is generally similar to the inner shape of the frame 203, the frame 203 fits the housing 101 by self-alignment with a predetermined direction and a predetermined height (see FIGS. 3A and 3B described later and a description thereof). Being generally similar means that as long as the shape of the frame 203 resembles the shape of the housing 101 to such an extent to allow fitting in a specific direction, the frame 203 and the housing 101 may not be perfectly similar. Note that, in the example of the figure, the upper part of the housing 101 is opened. However, in order to prevent a foreign substance from entering the inside, the opening may not be formed, and may be closed with a non-metallic material.

The ferromagnetic material 102 is arranged in the housing 101 so as to be continuous in the up-and-down direction. The ferromagnetic material 102 is formed in a tubular shape (pipe shape). The ferromagnetic material 102 is made of ferrite as an example. One end of the ferromagnetic material 102 is coupled to a bottom surface of the housing 101, and the other end is located at the generally same height as the opening of the housing 101. However, the other end of the ferromagnetic material 102 may be lower than the opening, or may be higher than the opening. The thickness of a tubular member of the ferromagnetic material 102 should be generally greater than the thickness of a skin depth according to a frequency used for power transmission. Accordingly, compared with a case where the ferromagnetic material 102 is not hollow, it is possible to reduce the weight and cost without sacrificing magnetic field characteristics. The manufacturing may be made easy by forming the cross-section to be a constant shape. However, there is no problem even if the ferromagnetic material 102 is not tubular, and the inside of the ferromagnetic material 102 is filled with a ferromagnetic material material.

The power transmission coil 103 is arranged inside the housing 101, and wire of the power transmission coil 103 is wound along an inner circumference of the housing 101 when seen from above. The power transmission coil 103 surrounds the ferromagnetic material 102. That is, the ferromagnetic material 102 penetrates the inside of the power transmission coil 103 in the up-and-down direction. The power transmission coil 103 is installed in the middle of the slope of the housing 101, so that the power reception coil 202 is located at a position at which the power reception coil 202 is coupled to the power transmission coil 103 with a high coupling coefficient, when the frame 203 of the drone fits the housing 101.

The power transmission circuit 104 supplies an alternating current to the power transmission coil 103, and generates an alternating electromagnetic field. The alternating current is an alternating current with a high frequency, such as 9 kHz, 85 kHz, and 6.78 MHz, for example.

Figure 3A:
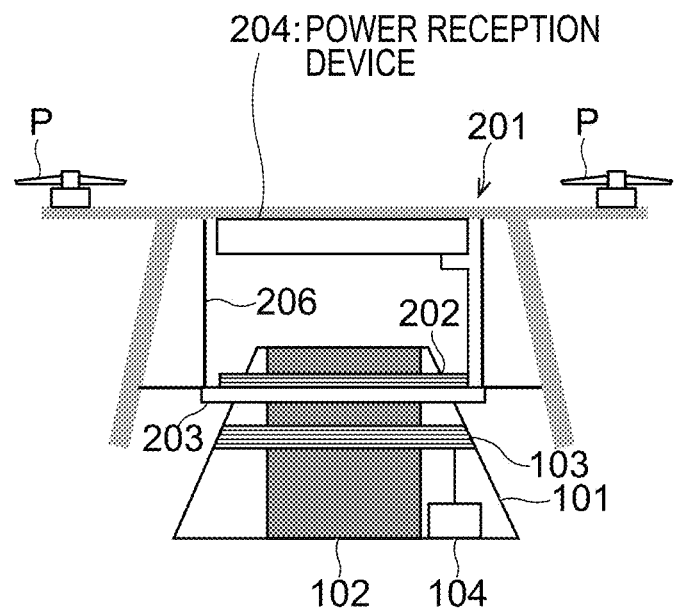
FIGS. 3A and 3B show a wireless power transmission device according to the first embodiment.
Figure 3B:
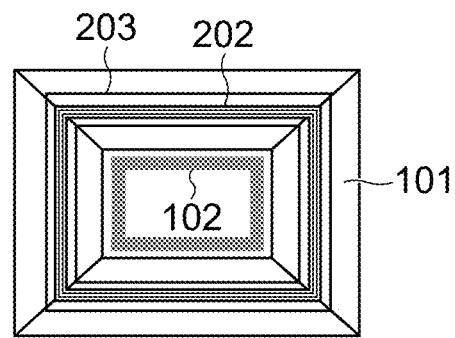

FIGS. 3A and 3B show a wireless power transmission device according to the first embodiment, including a vehicle (drone) and a power transmission device. An example is shown in which the drone lands on the housing 101 of the power transmission device, or is placed on the housing 101, and wireless charging is performed. The landing of the drone means that the drone descends to the housing 101 by automatic operation, and stops at a position for charging, and the placement of the drone means that a person or machine places the drone at the position for charging in the housing 101. Hereinafter, a description will be given by assuming the case where the drone lands. However, the description may be appropriately replaced for the case where a person, machine, etc. places the drone.

As described above, the outer shape of the cross-section of the housing 101 is generally similar to the inner shape of the frame 203 when seen from above, and the outer shape becomes larger from the top toward the bottom. Therefore, even when there is some horizontal position misalignment, angle misalignment, or both of these at the time of landing of the drone, self-alignment is performed such that the inner shape of the frame 203 and the outer shape of the cross-section of the housing 101 naturally have the same direction. Accordingly, the frame 203 fits the housing 101, and the drone is set to the position for charging. Therefore, at the time of landing, position misalignment and angle misalignment do not occur, or it is less likely that position misalignment and angle misalignment occur. The ferromagnetic material 102 penetrates through the inside of the frame 203 and the inside of the power reception coil 202. However, while the ferromagnetic material 102 exists inside the housing 101, the frame 203 and the power reception coil 202 exist outside the housing 101. The power reception coil 202 and the power transmission coil 103 oppose to each other via the frame 203 in the state where the power reception coil 202 and the power transmission coil 103 are wound around the same ferromagnetic material 102.

In this state, the power transmission circuit 104 supplies a high frequency current to the power transmission coil 103, and generates an alternating electromagnetic field. Among magnetic fluxes generated by the alternating electromagnetic field, most of the magnetic fluxes pass through the ferromagnetic material 102. With the electromagnetic induction action by these magnetic fluxes, an alternating current having the same frequency as the high frequency current flows into the power reception coil 202. This alternating current is input to the power reception device 204 as an output of the power reception coil 202. In the power reception device 204, the alternating current is converted into a direct current, or is subjected to frequency conversion as required, and is supplied to an electric instrument mounted on the drone. Accordingly, wireless power transmission is performed.

Figure 4A:
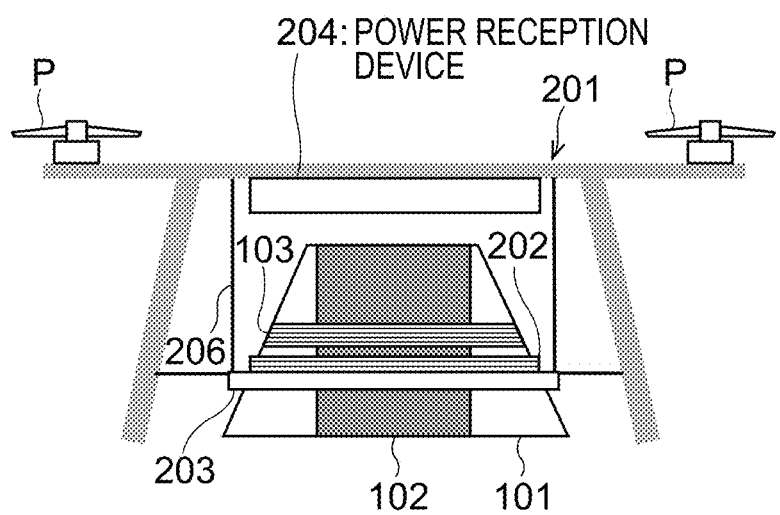
FIGS. 4A and 4B show another example of the wireless power transmission device according to the first embodiment.
Figure 4B:
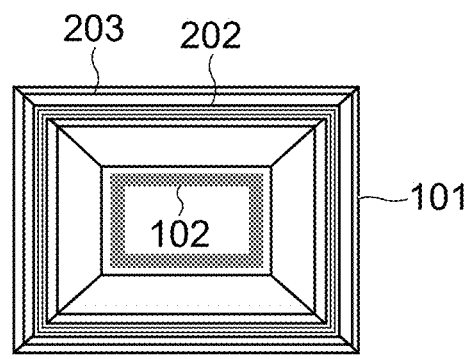

FIGS. 4A and 4B show another example of the wireless power transmission device according to the first embodiment. The numerals of the respective elements in FIGS. 4A and 4B are the same as those in FIGS. 3A and 3B. The illustration of the power transmission circuit 104, the connection wiring between the power reception coil 202 and the power reception device 204, etc. is omitted (the same applies hereinafter).

The difference from the wireless power transmission device in FIGS. 3A and 3B is that the size of a drone is larger than that in the first embodiment, and correspondingly, the size of the frame 203 (the size of an inner shape of the frame 203) and the size of the power reception coil 202 (the opening size of the power reception coil 202) are also made large. Accordingly, the height at which the frame 203 fits the housing 101 is lower than that in FIGS. 3A and 3B. Specifically, the height at which the frame 203 fits the housing 101 is lower than the power transmission coil 103. In this manner, the power transmission device of the present embodiment can correspond to a plurality of sizes of drones.

Figure 5A:
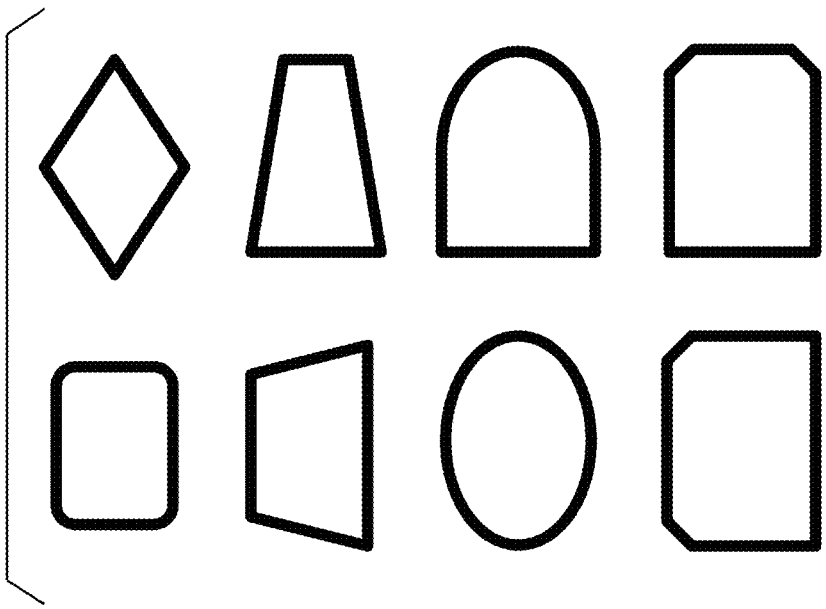
FIGS. 5A to 5C each is a diagram showing an example of the shape of a frame.
Figure 5B:
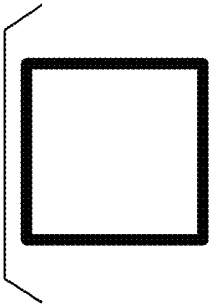
Figure 5C:
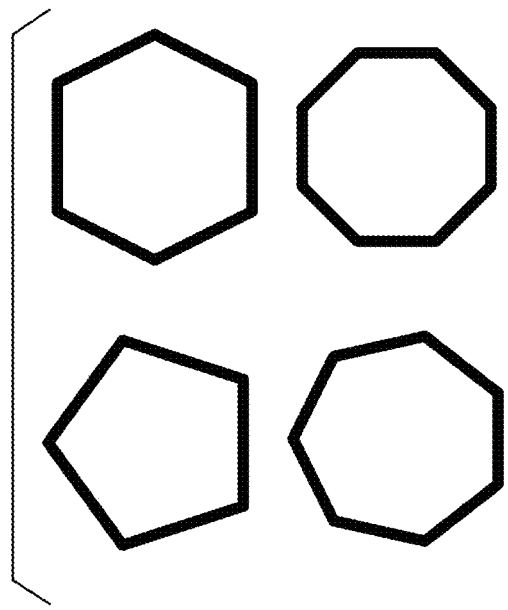

FIG. 5A to FIG. 5C are top views showing examples of the shape of the frame 203 other than the shape (a rectangle that is not a square) shown in FIGS. 2A to 2D, FIGS. 3A and 3B and FIGS. 4A and 4B. Each frame is formed in a hollow shape as an example. Note that, in each frame shown in FIGS. 5A to 5C, the outer shape and the inner shape are generally similar. However, the outer shape may not be similar to the inner shape (the inner shape may have a completely different shape from the outer shape). The same also applies to the frame 203 in FIGS. 2A to 2D described above.

The examples shown in FIG. 5A are examples of shapes other than a true circle and a regular polygon. Specifically, they are a shape (for example, an ellipse) that has a major axis and a minor axis, a shape (for example, a rectangle of a non-regular polygon) that has a long side and a shorter side, or a shape that has a straight line and a curved line. In these shapes, when the drone lands on the housing, even if there is some horizontal position misalignment or angle misalignment, self-alignment is performed so that their cross-sections have the same direction, and thus their angles are adjusted. Therefore, it is possible to prevent occurrence of position misalignment and angle misalignment.

The example shown in FIG. 5B is a square. In this shape, when there is an angle misalignment of, for example, about 45 degrees, depending on circumstances, there is a possibility that the done eventually lands in a state where there is a misalignment of, for example, 90 degrees. However, there is an advantage of manufacturing ease. Additionally, in the case of a square, when the frame width is the same, there is an advantage that the strength can be secured compared with a rectangle that is not a square.

The examples shown in FIG. 5C are examples of regular polygons. In the case of a regular pentagon, or a regular polygon in which the number of sides is more than five, when there is an angle misalignment less than 45 degrees, compared with a square, depending on circumstances, in the case of a regular pentagon, for example, there is a possibility that the done eventually lands in a state where there is a misalignment of 360 degrees/5=72 degrees. Therefore, it is desirable to devise a descending scheme/method so that angle misalignment does not occur at the time when the drone lands on the housing.

Figure 6:
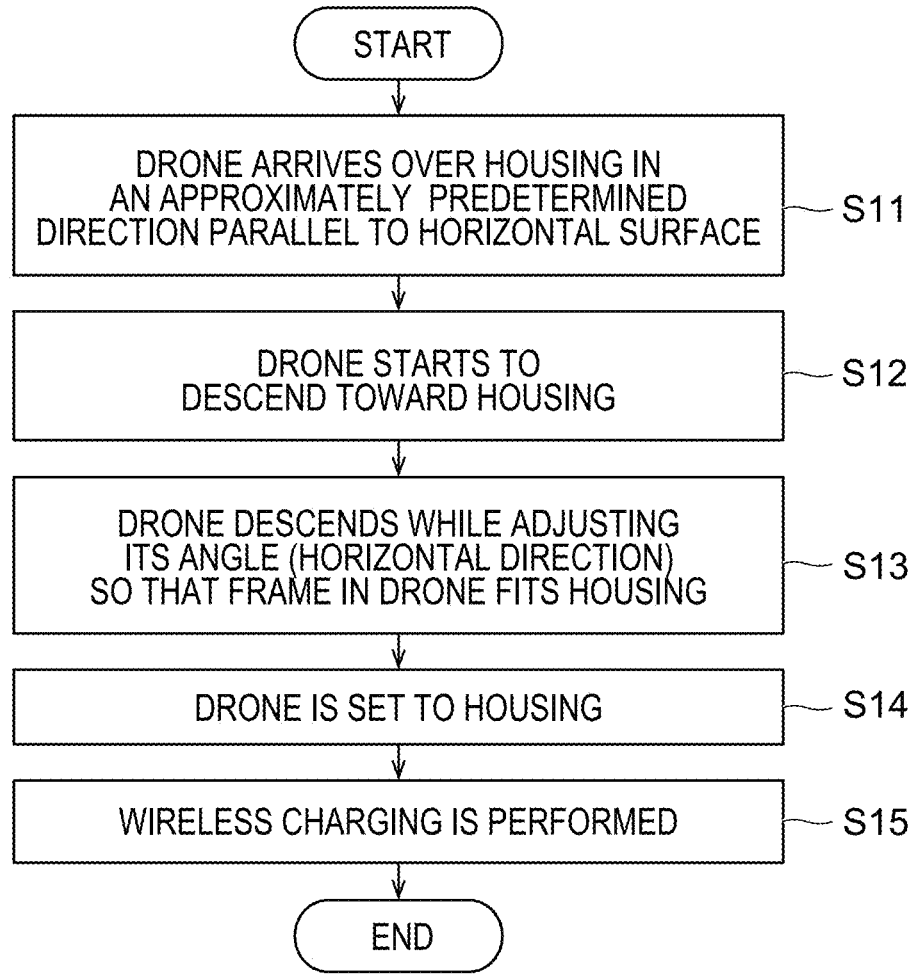
FIG. 6 is a diagram showing the flow of operations in a case where a drone according to the first embodiment lands on a power transmission device by automatic operation, and is charged.

FIG. 6 shows the flow of operations in a case where the drone according to the first embodiment lands on the power transmission device by automatic operation and is charged. The drone arrives over the housing 101 in an approximately predetermined direction parallel to the ground surface (a horizontal surface) (S11). The drone starts to descend toward the housing 101 (S12). The drone descends while adjusting its angle (horizontal direction) so that the frame 203 installed in the drone fits the housing 101 (S13). The frame 203 fits the housing 101, and accordingly, the drone is set to a position for charging of the housing 101 (S14). As an example of determining whether or not the drone is set to the position for charging of the housing 101, there is a method of using a sensor. For example, a distance sensor is provided in the drone, and the distance to a drone port (the ground surface) is measured. When the distance becomes equal to or less than a certain distance, it is determined that the drone is set to the position for charging of the housing 101. However, the method for determination is not limited to this. After the drone is set, wireless communication may be performed between the drone and the power transmission device, and parameters may be exchanged in order to perform wireless charging. Therefore, circuits for wireless communication may be provided in the power transmission device and the power reception device 204. After the parameters are exchanged, wireless charging is performed from the power transmission device to the drone (S15). That is, wireless power transmission is performed from the power transmission device to the drone, and the drone charges its inner battery with the received power.

Figure 7:
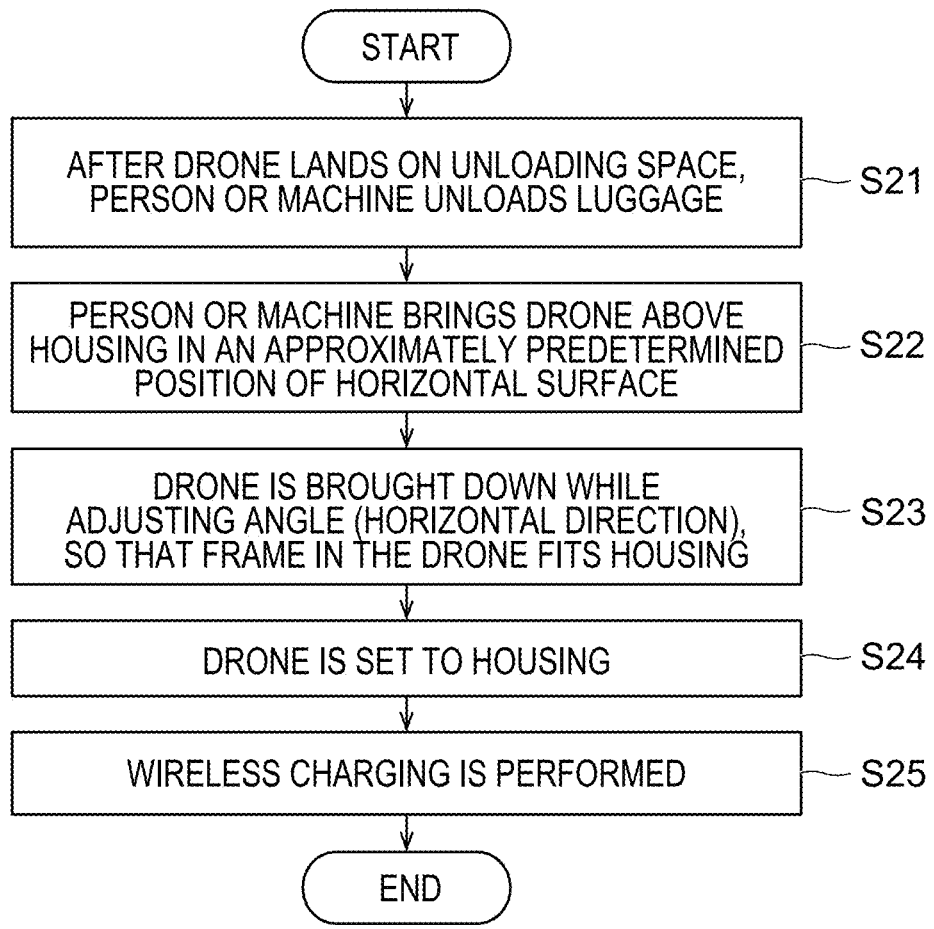
FIG. 7 is a diagram showing the flow of operations in a case where a person or machine places the drone in the power transmission device, and charges the drone.

FIG. 7 shows the flow of operations in a case where a person or machine mounts the drone in the power transmission device, and charging of the drone is performed. The drone lands on an unloading space, and the person or machine unloads the luggage carried by the drone (S21). The person or machine brings the drone above the housing from the unloading space (S22). The drone is brought down while adjusting the angle (horizontal direction) of the drone, so that the drone is leveled with the ground surface, and the frame 203 installed in the drone fits the housing 101 (S23). The frame 203 fits the housing 101, and accordingly, the drone is set to the position for charging of the housing 101 (S24). The person or machine inputs an instruction of wireless charging to the power transmission device or the drone. Accordingly, wireless charging is performed (S25). The instruction of wireless charging may be input by pressing a button for start charging provided in the drone or the power transmission device, a control device may be used that automatically detects the fitting/placement by a sensor, etc., and sends an instruction, or the input may be made by other methods.

As described above, according to the present embodiment, the outer shape of the cross-section of the housing 101 is generally similar to the inner shape of the frame 203 when seen from above, and the outer shape becomes larger from the top toward the bottom. Therefore, at the time of landing of the drone, position misalignment/angle misalignment does not occur, or it is possible to make it less likely that position misalignment/angle misalignment occurs.

Additionally, according to the present embodiment, since the power transmission coil 103 is installed in the middle of the slope of the housing 101, when the drone lands on the housing 101, the distance between the power transmission coil 103 and the power reception coil 202 is reduced. Accordingly, the coupling coefficient between the coils is increased, and the power transmission efficiency is improved.

Additionally, according to the present embodiment, since the housing 101 has a sloped shape that is linearly spread, it is possible to reduce the possibility that a metallic foreign object remains on a surface of the housing 101 (especially, in the vicinity of the power transmission coil 103 and the power reception coil 202). Accordingly, it is possible to reduce the possibility that heating occurs due to generation of eddy current in the metallic foreign object at the time of power transmission (wireless charging).

As a modification of the shape of the housing 101, it is possible to adopt a configuration in which the increase rate of spread is made greater in the upper part, and the lower it becomes, the greater the increase rate is made. In this case, the possibility that a foreign object stays on the housing becomes lower. As another modification, it is also possible to adopt a configuration in which the increase rate of spread is made smaller in the upper part, and the lower it becomes, the higher the increase rate is made. In this case, it is possible to reduce phenomena that, when the drone swiftly descends, the frame 203 of the drone strongly fits the housing 101, and it becomes difficult for the frame 203 to be separated from the housing 101. Additionally, in the state where the frame 203 fits the housing 101, the curvature radius of a predetermined portion of the frame 203 may be different from the curvature radius of a portion of the housing corresponding to the predetermined portion. Also in this case, it is possible to reduce phenomena that, when the drone swiftly descends, the frame 203 of the drone strongly fits the housing 101, and it becomes difficult for the frame 203 to be separated from the housing 101.

Additionally, according to the present embodiment, it is possible to set the frame 203 of the drone to the housing 101 at any height and in a desired direction by making the housing 101 into a frustum shape or a shape obtained by modifying the slope of a frustum, and making the frame 203 of the drone generally similar to the cross-section of the frustum when seen from above, and have an appropriate size corresponding to the size of the drone. Accordingly, it is possible to correspond to drones of different sizes. The same effect can be obtained by changing the shape of the slope of the housing 101.

Further, according to the present embodiment, it is unnecessary to arrange a ferromagnetic material in the drone, since the ferromagnetic material 102 is arranged inside the truncated four-sided pyramid. Accordingly, it is possible to reduce the weight of the drone.

Second Embodiment

Figure 8:
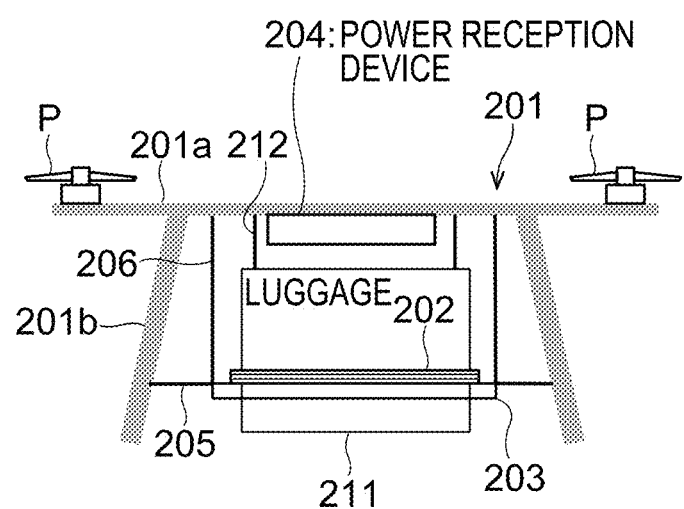
FIG. 8 is a diagram showing a vehicle according to a second embodiment.

FIG. 8 is a diagram showing a vehicle according to a second embodiment. The wiring between the power reception coil 202 and the power reception devices 204 is omitted (the same applies hereinafter).

The drone, which is a vehicle, is loaded with luggage 211. The luggage 211 is arranged under the power reception device 204, and is hung from the top plate by a support member 212. The lower part of the luggage 211 passes through the opening of the power reception coil 202 and the opening of the frame 203. Accordingly, at least one of the frame 203 and the power reception coil 202 functions as a cover that prevents shaking of the luggage 211 during the flight of the drone.

When charging the drone, the person or machine removes the luggage 211 from the drone that has arrived at a port. Thereafter, the drone hovers by automatic maneuvering, moves over the housing 101, and lands on the housing 101. Alternatively, the person or machine carries the drone over the housing 101, and places the drone on the housing 101. Further, the inner corners of the frame 203 may be rounded, so as to improve the durability against repeated descending and placement to the housing 101.

Third Embodiment

Figure 9A:
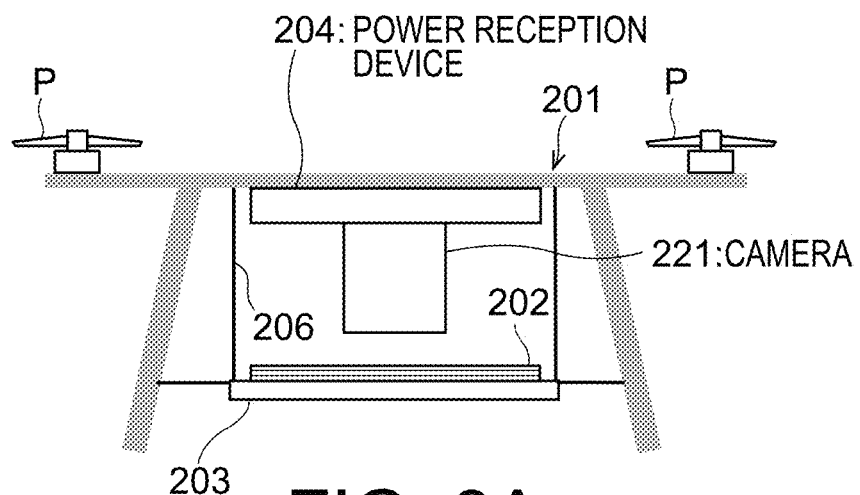
FIG. 9A is a diagram showing a vehicle according to a third embodiment.
Figure 9B:
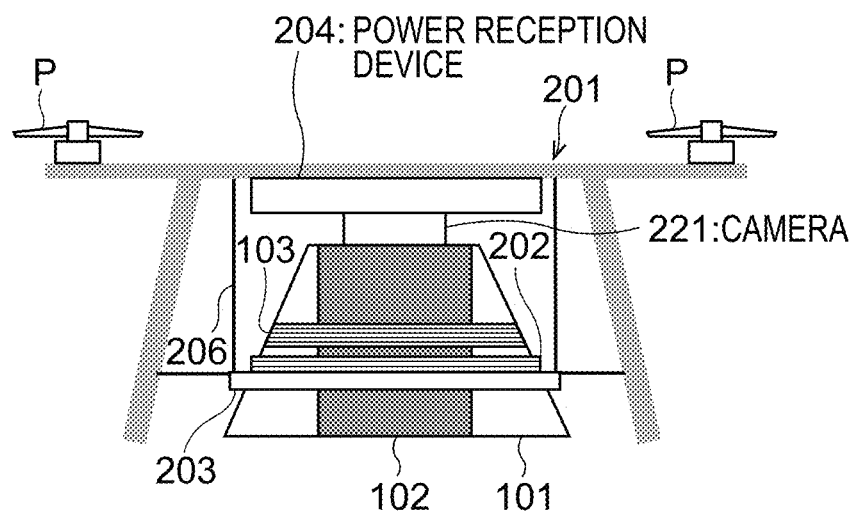
FIG. 9B is a diagram showing a state where the vehicle is placed in the power transmission device.
Figure 9C:
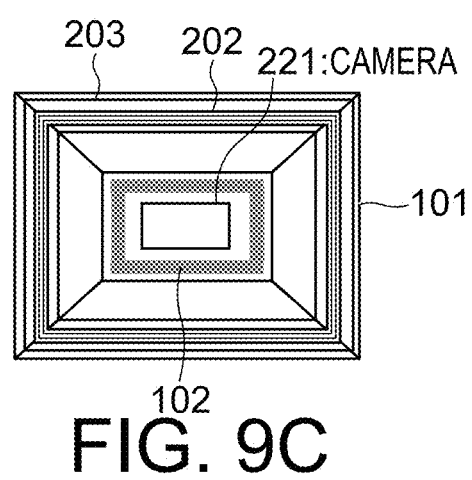
FIG. 9C is a plan view showing the power transmission device, a frame, and a power reception coil in FIG. 9B in a removed state.

FIG. 9A is a diagram showing a vehicle according to a third embodiment. FIG. 9B shows the state where the vehicle is set to the power transmission device. FIG. 9C is a plan view showing the power transmission device, the frame 203, the power reception coil 202, and a camera 221 in FIG. 9B in a removed state.

As shown in FIG. 9A, the camera 221 for monitoring is arranged under the power reception device 204. The camera 221 is located in approximately the middle of the drone body 201. As shown in FIG. 9B and FIG. 9C, when the drone lands on the housing 101 and is set to the position for charging, the camera 221 is contained in the hollow part of a pipe of the ferromagnetic material 102. Therefore, it is unnecessary to remove the camera 221 from the drone. When wireless charging is performed in this state, magnetic fluxes are concentrated to the ferromagnetic material 102, and there is a few magnetic fluxes that pass through the hollow part of the pipe. Therefore, there is little influence of the magnetic fluxes to the camera 221.

Fourth Embodiment

Figure 10A:
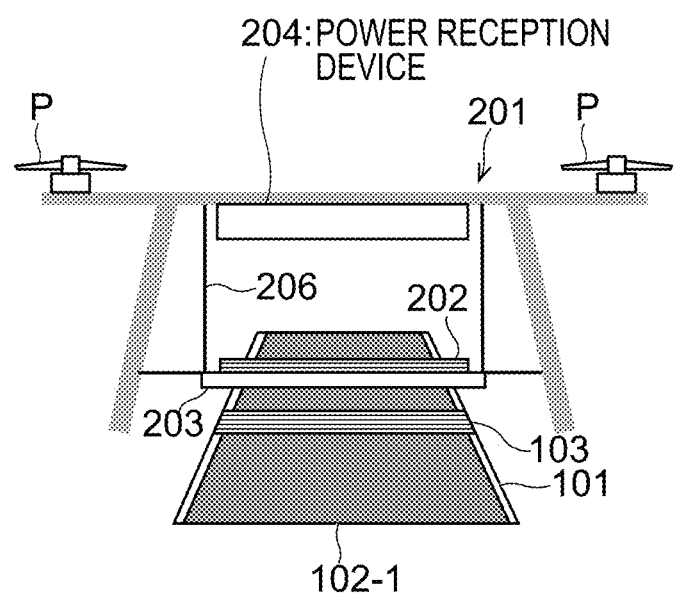
FIG. 10A is a diagram showing a wireless power transmission device according to a fourth embodiment, including the power transmission device and the vehicle.

FIG. 10A shows a wireless power transmission device according to a fourth embodiment, including the power transmission device and the vehicle. Note that a power transmission circuit (not shown) that supplies an alternating current to the power transmission coil 103 may exist inside a ferromagnetic material 102-1, or may exist outside the housing 101.

In FIG. 10A, the ferromagnetic material 102-1 has a generally horn shape so as to follow the frustum of the housing 101, instead of the cylindrical shape as shown in FIGS. 1A and 1B or FIGS. 3A and 3B, etc. That is, though the ferromagnetic material 102-1 is tubular, the ferromagnetic material 102-1 has a shape that is spread toward the bottom. The thickness of a tubular member of the ferromagnetic material 102-1 is almost constant. The cross-sectional area of the ferromagnetic material 102-1 becomes larger toward the bottom. Therefore, at the time of wireless charging, since the passing magnetic fluxes per unit area are decreased, the loss in the ferromagnetic material is decreased. Additionally, since the distance between the ferromagnetic material 102-1 and the power transmission coil 103, and the distance between the ferromagnetic material 102-1 and the power reception coil 202 become close, it is expected that more magnetic fluxes pass through the ferromagnetic material than the gap between the power transmission coil 103 and the ferromagnetic material 102-1, the gap between the power reception coil 202 and the ferromagnetic material 102-1, and the hollow part of the ferromagnetic material 102-1. Therefore, leakage fluxes are decreased, the coupling coefficient between the power transmission coil 103 and the power reception coil 202 is improved, and the power transmission efficiency (charging efficiency) is improved. Additionally, since the hollow part of the ferromagnetic material 102-1 becomes larger toward the bottom, the space for implementing other instruments becomes large.

Figure 10B:
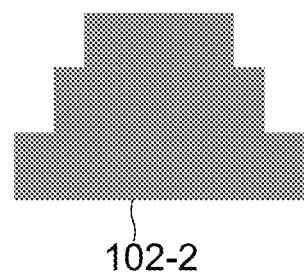
FIG. 10B is a diagram showing another exemplary configuration of a ferromagnetic material.

FIG. 10B shows another exemplary configuration of the ferromagnetic material. A ferromagnetic material 102-2 having a shape that becomes larger in a stepwise manner toward the bottom is shown. The ferromagnetic material 102-2 becomes larger in a stepwise manner not only in the left-and-right direction along the page, but also in the front-and-back direction. The ferromagnetic material 102-2 is tubular, and the thickness of the member of the ferromagnetic material 102-2 is almost constant. In this configuration, manufacturing is easier than that in FIG. 10A. For example, the ferromagnetic material 102-2 can be manufactured by arranging square ferrite blocks without a gap, and joining the blocks together with an adhesive, etc.

Fifth Embodiment

Figure 11A:
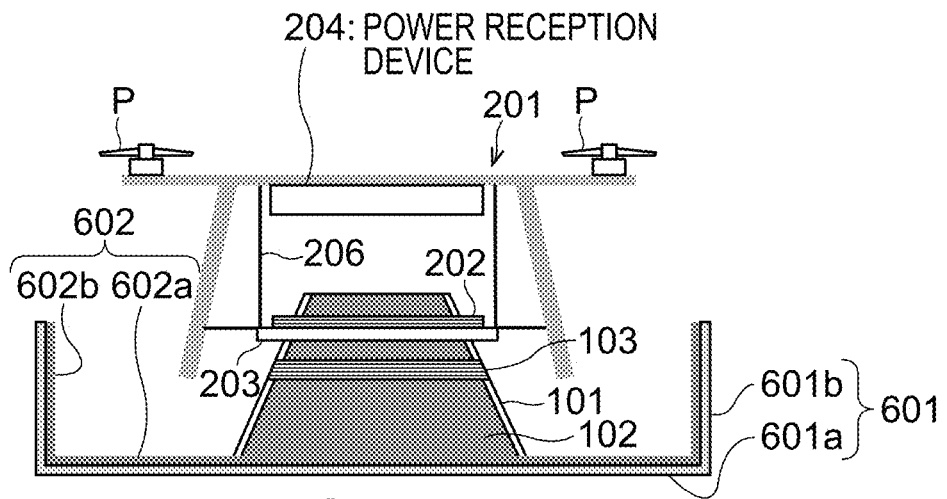
FIGS. 11A and 11B show a wireless power transmission device according to a fifth embodiment, including the vehicle and the power transmission device.
Figure 11B:
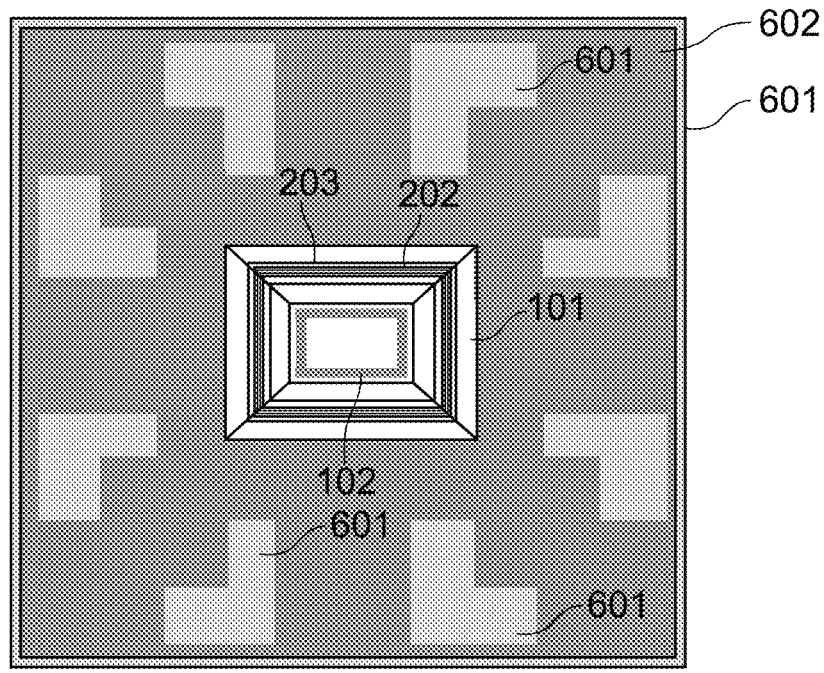

FIGS. 11A and 11B show a wireless power transmission device according to a fifth embodiment, including the vehicle and the power transmission device. The lower part of the housing 101 is opened, and the lower part of the ferromagnetic material 102 is exposed from the opening. A ferromagnetic material 602 is formed that is coupled to the lower part of the ferromagnetic material 102, and surrounds the space around the housing 101, the power transmission coil 103, and the power reception coil 202, etc. The ferromagnetic material 602 includes a first ferromagnetic material part 602a and a second ferromagnetic material part 602b.

The entire first ferromagnetic material part 602a has a rectangular shape that is entirely or selectively covered with block-shaped magnetic bodies (ferrite, etc.). In the figure, an example is shown in which the first ferromagnetic material part 602a is selectively covered with the blocks, and a shield member 601 is exposed at portions where the blocks are not arranged. What is required is to create the return route for magnetic fluxes so as to allow the magnetic fluxes generated at the time of power transmission to form a loop. Thus, there is no problem even if the blocks are selectively intermittent in this manner. The first ferromagnetic material part 602a is generally parallel to the ground surface. The surface of the first ferromagnetic material part 602a is coupled to the bottom surface of the ferromagnetic material 102. The second ferromagnetic material part 602b is arranged generally perpendicular to the first ferromagnetic material part 602a in the four side parts of the first ferromagnetic material part 602a.

The outer side of the ferromagnetic material 602 is covered by a shield member 601 that shields magnetic fluxes. The shield member 601 is an aluminum member as an example. However, the shield member 601 may be other members as long as those are members that shield magnetic fluxes. The shield member 601 includes a first shield material part 601a that is generally parallel to the ground surface, and a second shield material part 601b that is provided generally perpendicular to the four side parts of the first shield material part 601a. The first shield material part 601a is adjacent to the first ferromagnetic material part 602a, and the second shield material part 601b is adjacent to the second ferromagnetic material part 602b.

With the ferromagnetic material 602, at the time of wireless charging, it is possible to secure the return route for magnetic fluxes formed by electromagnetic induction (to secure the loop of magnetic fluxes), and to reduce radiated emission. Further, since the shield member 601 is formed on the outer side of the ferromagnetic material 602, and shields magnetic fluxes, it is possible to further reduce radiated emission.

Sixth Embodiment

Figure 12A:
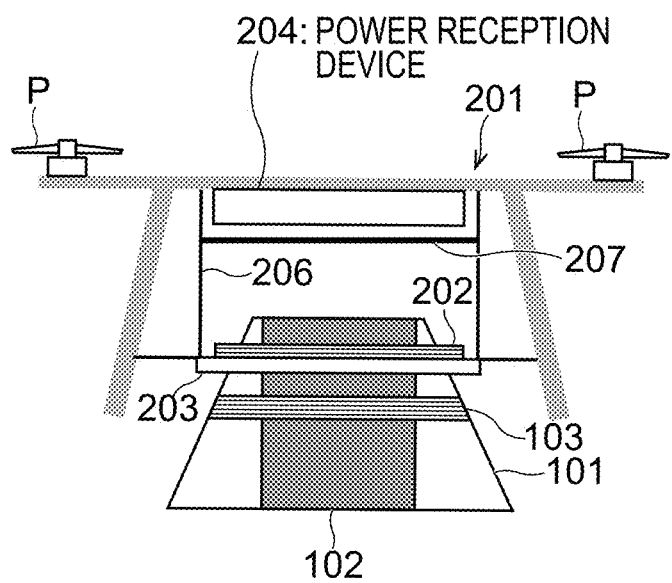
FIGS. 12A and 12B each is a diagram showing a wireless power transmission device according to a sixth embodiment, including the vehicle and the power transmission device.
Figure 12B:
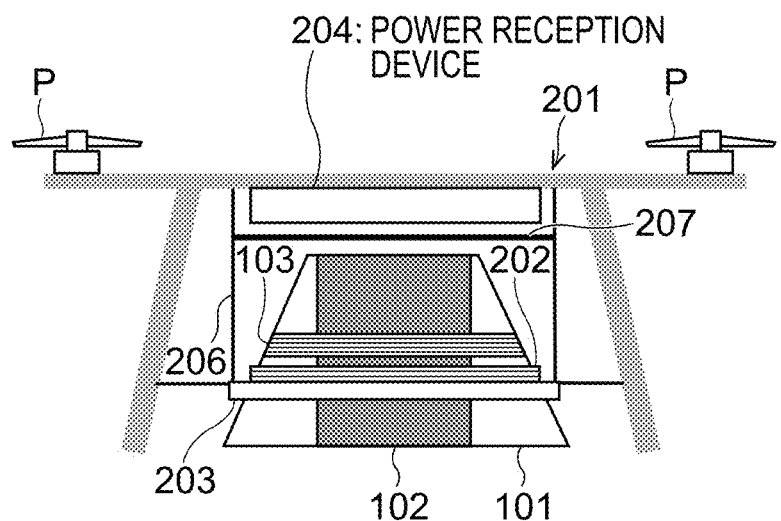

FIGS. 12A and 12B is a diagram showing a wireless power transmission device according to a sixth embodiment, including the vehicle and the power transmission device. FIG. 12A shows a case where the size of the vehicle is usual, and FIG. 12B shows a case where the size of the vehicle is larger than that in FIG. 12A. In FIG. 12A and FIG. 12B, the states are shown where the frame 203 of the drone fits the housing 101 of the power transmission device. A loop (dummy loop) 207 of a conductor that functions as a magnetic shield for reducing radiated emission is arranged under the power reception device 204 in the drone body 201. The dummy loop 207 and the power reception coil 202 face to each other. The shape of the dummy loop 207 may be a rectangle, a circle, or any other shapes. The dummy loop 207 is located higher than the upper part of the housing 101, and the ferromagnetic material 102 does not penetrate through the inside of the dummy loop 207.

According to the above-described configuration, at the time of power transmission, an alternating current that negates alternating fluxes is induced to the dummy loop 207 by electromagnetic induction by alternating fluxes that cross the dummy loop 207. Accordingly, it is possible to reduce radiated emission.

Seventh Embodiment

Figure 13A:
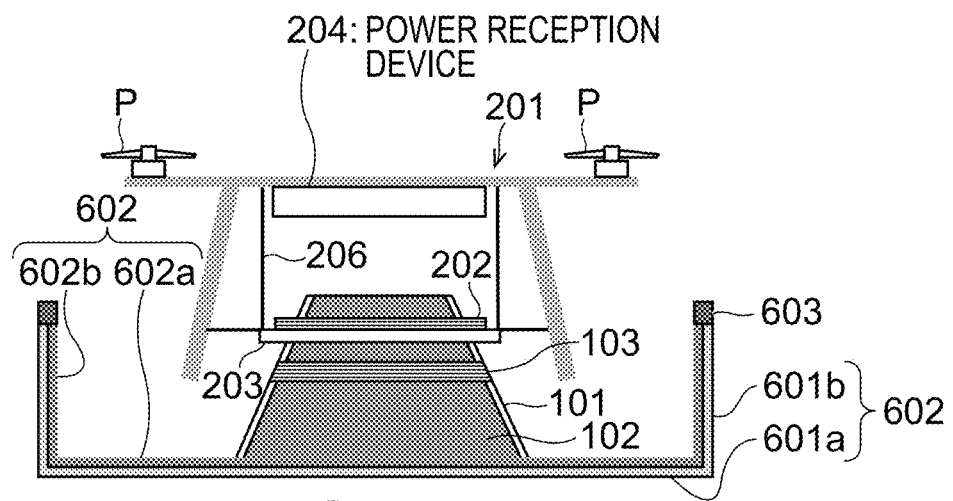
FIGS. 13A and 13B show a wireless power transmission device according to a seventh embodiment, including the vehicle and the power transmission device.
Figure 13B:
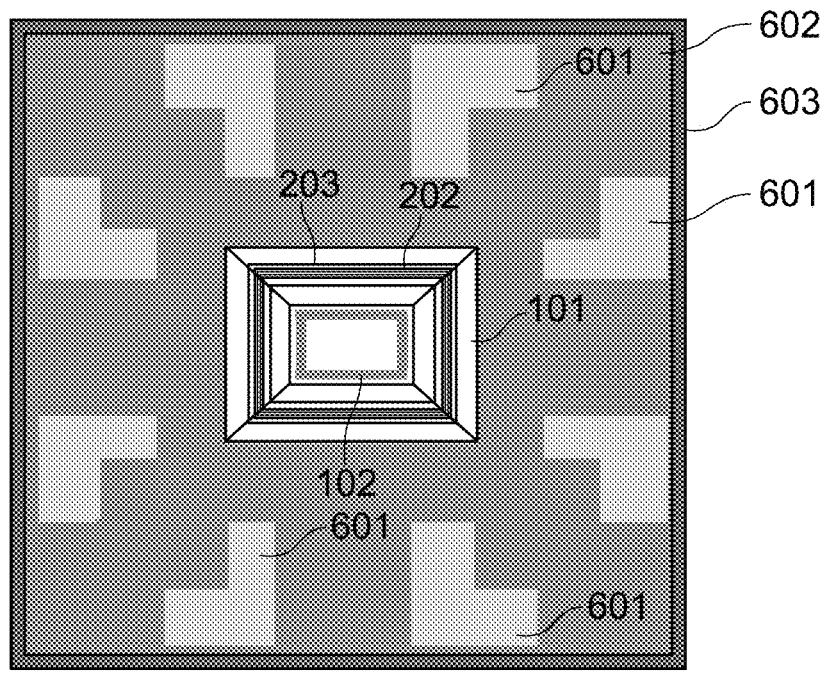
Figure 14A:
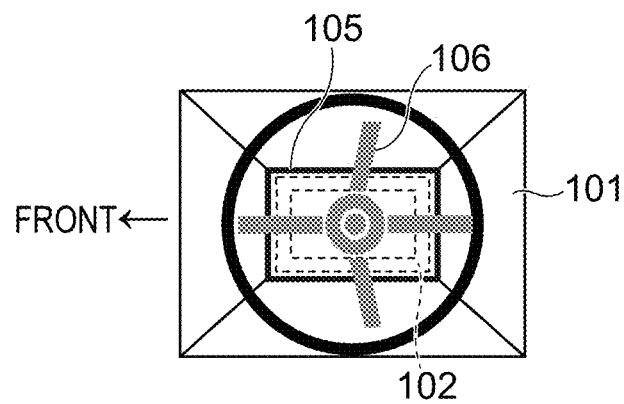
FIGS. 14A to 14D each is a top view showing a power transmission device according to an eighth embodiment.
Figure 14B:
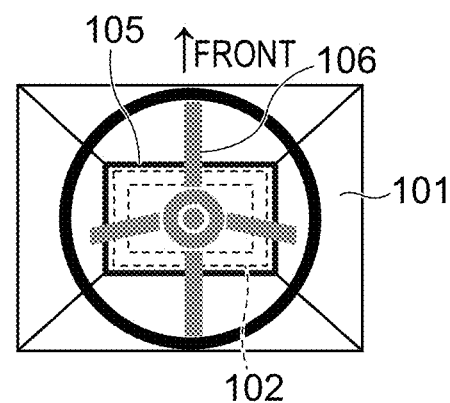
Figure 14C:
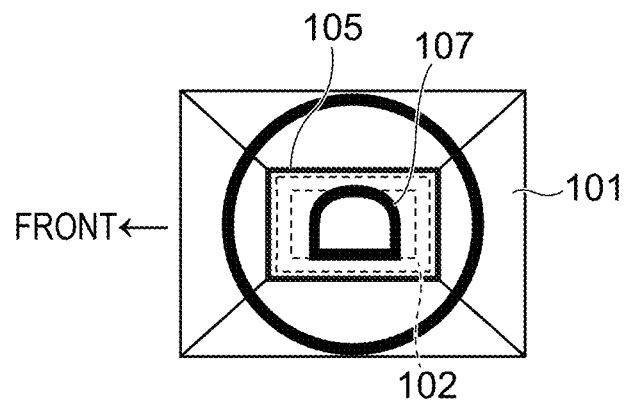
Figure 14D:
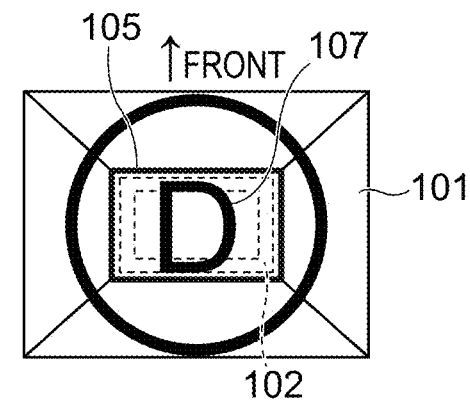

FIGS. 13 and 13B show a wireless power transmission device according to a seventh embodiment, including the vehicle and the power transmission device. A loop (dummy loop) 603 of the conductor is provided to the power transmission device of the wireless power transmission device shown in FIGS. 11A and 11B. The dummy loop 603 functions as a magnetic shield for reducing radiated emission. Although the dummy loop was provided in the vehicle side in the embodiment of FIGS. 12A and 12B, the dummy loop is provided in the power transmission device side (ground side) in the present embodiment.

The dummy loop 603 is placed at the position surrounding the drone and the power transmission device. In the example of the figure, the dummy loop 603 is placed so as to extend across the ends of the second ferromagnetic material part 602b that are opposite to the ends thereof on the ground, and the ends of the second shield material part 601b that are opposite to the ends thereof on the ground. At the time of power transmission, an alternating current that negates alternating fluxes is induced to the dummy loop 603 by electromagnetic induction by alternating fluxes that cross the dummy loop 603. Accordingly, radiated emission is reduced. The dummy loop may be provided in both of the ground side and the drone side by combining the present embodiment with the embodiment of FIGS. 12A and 12B. Accordingly, it is possible to further reduce the emission.

Eighth Embodiment

FIG. 14A, FIG. 14B, FIG. 14C, and FIG. 14D are top views showing power transmission devices according to an eighth embodiment. A lid 105 that seals the opening is provided above the housing 101 in each of the power transmission devices. The lid 105 is made of a non-metallic material, such as plastic. The lid 105 may be made of the same material as the housing 101, or may be made of a different material.

A mark 106 or 107 that serves as the target of landing for the drone when the power transmission device is seen from the sky is drawn on the housing 101. The mark is colored in an arbitrary color. The mark extends across the four side surfaces and the lid 105 of the truncated four-sided pyramid. The mark 106 or 107 indicates the direction to which the drone is to be landed. In the figure, the direction written as "front" indicates the direction to which the drone is to be faced. Note that the characters "front" are written for description, and are not actually drawn on the power transmission device. However, it does not eliminate that the characters "front" are drawn. The drone can land itself on the housing 101 in a predetermined direction by detecting the mark 106 or 107 with the use of a mounted camera or sensor, and performing control to perform position alignment with the detected mark.

According to the present embodiment, it is possible to more correctly match the direction of the drone by drawing the mark 106, 107 on the housing 101 (including the lid 105) of the power transmission device. Additionally, in cases where it is regulated by specifications, standards, laws or the like to draw a mark on a drone port as the requirements for the drone port, it is possible to arrange the power transmission device while satisfying the requirements for the drone port.

Ninth Embodiment

Figure 15:
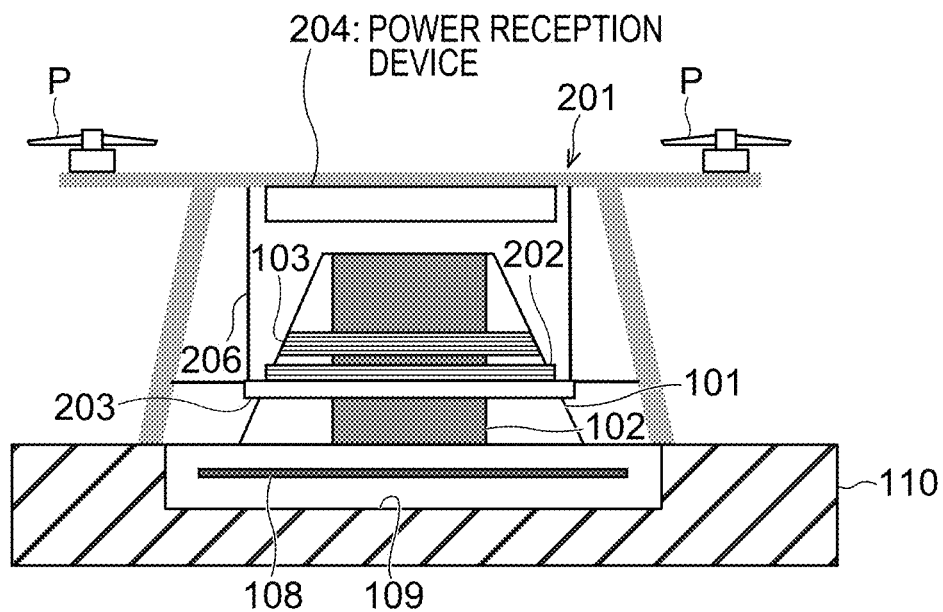
FIG. 15 is a diagram showing a wireless power transmission device according to a ninth embodiment, including the vehicle and the power transmission device.

FIG. 15 is a diagram showing a wireless power transmission device according to a ninth embodiment, including the vehicle and the power transmission device. As a magnetic shield for reducing radiated emission, a loop (dummy loop) 108 of the conductor is placed further lower than the lower part of the housing 101 of the power transmission device. Another housing (box) 109 made of a material such as plastic is arranged in an underground 110 under the housing 101, and the dummy loop 108 is arranged inside the housing 109. The dummy loop 108 is held so as to be generally parallel to the power transmission coil 103 and the power reception coil 202. The dummy loop 108 may be held by any holder. For example, a table (not shown) may be provided inside the housing 109, and the dummy loop 108 may be placed on the table, or the dummy loop 108 may be supported by a support member, which is not shown, from a side surface of the housing 109. Alternatively, the dummy loop 108 may be fixed to the upper surface or the bottom surface of the housing 109.

According to the configuration of FIG. 15, at the time of power transmission, an alternating current that cancels alternating fluxes is induced to the dummy loop 108 by electromagnetic induction by alternating fluxes that cross the dummy loop 108. Accordingly, radiated emission is reduced.

Tenth Embodiment

Figure 16:
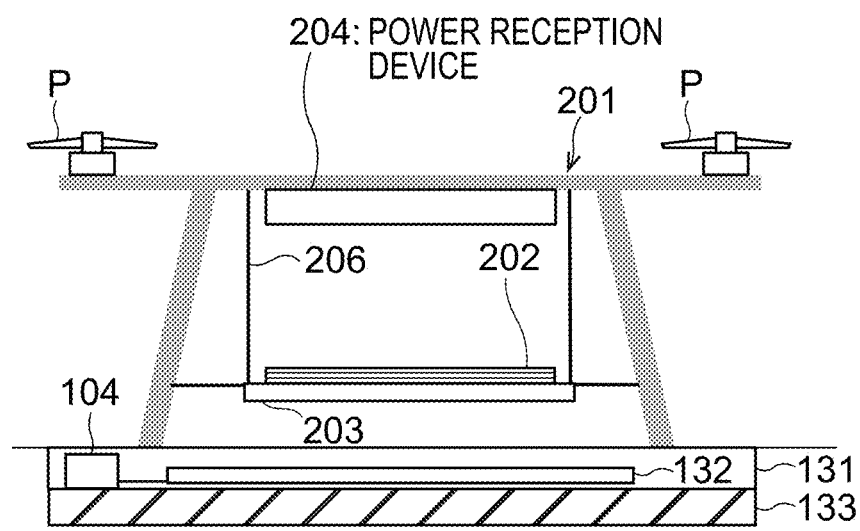
FIG. 16 is a diagram showing a wireless power transmission device according to a tenth embodiment, including the vehicle and the power transmission device.

FIG. 16 is a diagram showing a wireless power transmission device according to a tenth embodiment, including the vehicle and the power transmission device. The vehicle (drone) in FIG. 16 is the same as that in FIGS. 4A and 4B or FIG. 8, etc. The housing of the power transmission device is a cone, such as a square cone, in the foregoing embodiments, and the drone lands by fitting the frame 203 of the drone to the cone at the corresponding height of the cone. However, in FIG. 16, the drone lands on a surface of the housing 131. A housing 131 is a flat-surface type housing. The shape of the housing 131 is a rectangular parallelepiped as an example. The frame 203 of the drone plays a role to prevent shaking of the luggage (see FIG. 8).

A power transmission coil 132 is arranged inside the housing 131 so as to oppose to the power reception coil 202 of the drone that lands on the surface of the housing 131. Additionally, the power transmission circuit 104 is arranged inside the housing 131. The power transmission circuit 104 is connected to the power transmission coil 132 by wiring, etc. The power transmission circuit 104 may be arranged outside the housing 131. A planar ferromagnetic material 133 is arranged under the housing 131. The ferromagnetic material 133 is adjacent to the bottom surface of the housing 131 in the example of the figure, and the entire size of the ferromagnetic material 133 is generally the same as the bottom surface of the housing 131. The ferromagnetic material 133 may be configured to have a partially cut out portion (see FIGS. 11A and 11B, FIGS. 13A and 13B).

The drone lands on the surface of the housing 131 at the position where the power reception coil 202 opposes to the power transmission coil 132, in order to be wireless charged. Although there is a possibility that variation in transmission efficiency may be increased due to variation in landing positions, the size of the drone, etc., there is an advantage that restrictions to the shape and size of the drone are reduced.

Eleventh Embodiment

Figure 17A:
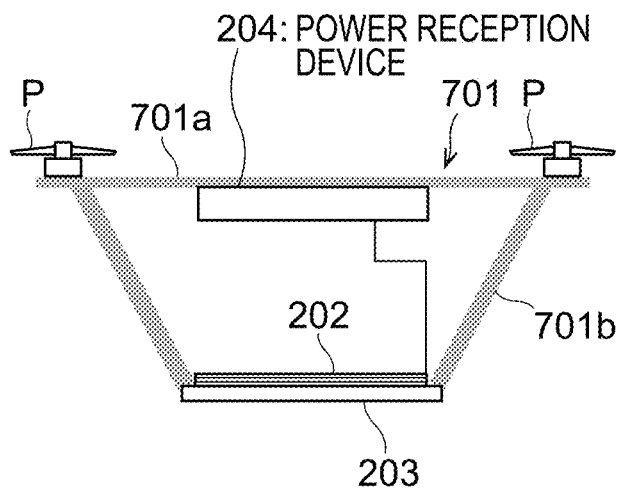
FIG. 17A is a diagram showing a vehicle according to an eleventh embodiment.
Figure 17B:
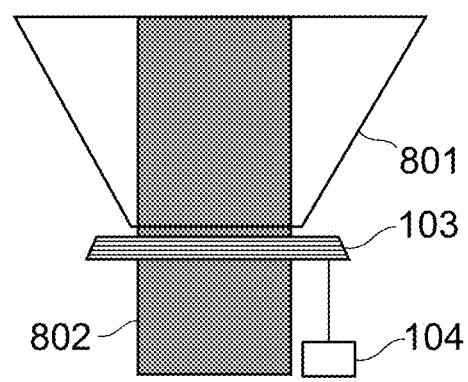
FIG. 17B is a diagram showing a power transmission device according to the eleventh embodiment.

FIG. 17A shows a vehicle according to an eleventh embodiment, and FIG. 17B shows a power transmission device according to the eleventh embodiment.

As shown in FIG. 17A, the drone, which is a vehicle, includes a drone body 701, the power reception coil 202, the frame 203, and the power reception device 204. A body frame of the drone body 701 includes a top plate 701a and a plurality of legs 701b. Although the number of the legs 701b is four as in the configuration of FIG. 2B as an example, the number is not limited to this. Although the four legs are spread toward the bottom so as to be distant from each other in FIG. 2B, the distance between the four legs becomes narrower toward the bottom of the drone in FIG. 17A. However, similar to FIG. 2B, the four legs may be spread toward the bottom of the drone. Additionally, in FIG. 2A, the frame 203 is connected to the legs 201b via the support member 205. However, in FIG. 17A, the frame 203 is directly attached to the tips of a plurality of the legs 701b. Any methods may be used as the attaching method, such as a method of using a binding band. Similar to FIG. 2A, the configuration in which the frame 203 is attached to the legs 701b via the support member 205 is also not eliminated.

As shown in FIG. 17B, the power transmission device includes a drone placement housing (the housing) 801, a ferromagnetic material 802, the power transmission coil 103, and the power transmission circuit 104. The inner cross-sectional shape of the housing 801 becomes smaller from the top toward the bottom, and the inner cross-sectional shape is a non-true circle. In the figure, as an example, the housing 101 is a truncated four-sided pyramid, and the cross-sectional shape is a rectangle. The bottom of the housing 101 is opened. The housing 801 has a reversed sloped shape that is linearly narrowed. The inner shape of the cross-section of the housing 801 is generally similar to the outer shape of the frame 203. The housing 801 is made of a non-metallic material (for example, carbon, plastic, a mixture of carbon and plastic, glass, a mixture of glass fiber and a plastic, FRP, etc.) as an example. The housing 801 may be formed by a tabular member having a generally constant thickness, or may be a three-dimensional integral configuration.

The ferromagnetic material 802 penetrates through the bottom opening of the housing 801, and is arranged so as to be continuous in the up-and-down direction of the housing 801. Accordingly, the upper side of the ferromagnetic material 802 is surrounded by the housing 801. The ferromagnetic material 802 is formed in a tubular shape (a pipe shape). The ferromagnetic material 802 is made of ferrite as an example. The lower end of the ferromagnetic material 802 is arranged directly on a drone port (ground surface) or is arranged on the drone port via another member, and the upper end of the ferromagnetic material 802 is at generally the same height as the upper surface of the housing 801. However, it is possible to adopt either of the following configurations: the configuration in which the upper end of the ferromagnetic material 802 is higher than the upper surface of the housing 801; and the configuration in which the upper end of the ferromagnetic material 802 is lower than the upper surface of the housing 801. The outer shape of the cross-section of the ferromagnetic material 802 seen from above is smaller than the opening of the frame 203, and the opening of the power reception coil 202. The other conditions of the ferromagnetic material 802, such as the thickness and the shape, are similar to those of the ferromagnetic material 102.

The power transmission coil 103 is wound around he lower side of the ferromagnetic material 802 in the outer side of the housing 801. According to the insulating property of the wire forming the power transmission coil 103 and the insulating property of the ferromagnetic material 802, under the condition that does not cause a short circuit with the electric power to be applied, the power transmission coil 103 may be directly wound around the ferromagnetic material 802, or may be arranged so as not to directly contact the ferromagnetic material 802. In the latter case, the ferromagnetic material 802 needs to be held at a predetermined height by an arbitrary holder. The power transmission circuit 104 is connected to the power transmission coil 103. As a modification, the power transmission coil 103 may be arranged inside the housing 801.

Figure 18A:
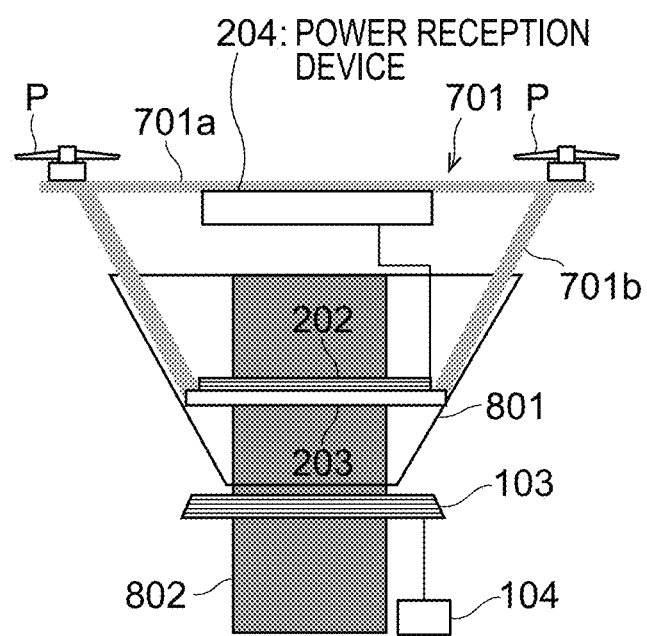
FIG. 18A is a diagram showing a wireless power transmission device including the vehicle in FIG. 17A and the power transmission device in FIG. 17B.
Figure 18B:
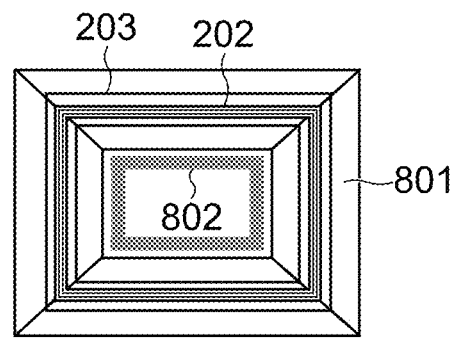
FIG. 18B is a top view of a housing, a ferromagnetic material, a power reception coil, and a frame in FIG. 18A in a removed sate.

FIG. 18A shows a wireless power transmission device including the vehicle in FIG. 17A and the power transmission device in FIG. 17B, and a state where the vehicle has landed on the power transmission device is shown. FIG. 18B is a top view of the housing 801, the ferromagnetic material 802, the power reception coil 202, and the frame 203 in FIG. 18A in a removed state.

As described above, the inner shape of the cross-section of the housing 801 is generally similar to the outer shape of the frame 203, and the cross-section of the housing 801 becomes smaller from the top toward the bottom. Therefore, when the drone lands on the housing 801, even if there are some horizontal misalignment, angle misalignment, or both of these, self-alignment is performed such that the outer shape of the frame 203 matches the inner shape (the shape of the opening) of the cross-section of the housing 801 in generally the same direction. Accordingly, the frame 203 fits the housing 101, and the drone is set to the position for charging in a predetermined direction. Since the drone is placed by adjusting the angle by the self-alignment, position misalignment/angle misalignment does not occur, or it is less likely that position misalignment/angle misalignment occurs. The operation at the time of wireless charging using the power transmission circuit 104 is similar to that of the first embodiment. That is, a high frequency alternating current is output from the power transmission circuit 104, and an alternating electromagnetic field is generated in the power transmission coil 103. Among magnetic fluxes generated by the generated alternating electromagnetic field, most of the magnetic fluxes pass through the ferromagnetic material 802. With the electromagnetic induction action by these magnetic fluxes, an alternating current having the same frequency as the above-described high frequency current flows into the power reception coil 202. This alternating current is input to the power reception device 204. In the power reception device 204, the alternating current is converted into a direct current, or is subjected to frequency conversion as required. The current after the conversion is supplied to the electric instrument mounted in the drone. Accordingly, wireless power transmission is performed.

In the example of FIGS. 18A and 18B, the housing 801 has a sloped shape that is linearly narrowed toward the bottom. However, it is also possible to adopt the configuration in which the decrease rate (the change rate) of spreading in the upper part is made lower, and the decrease rate (the change rate) of spreading is made higher toward the lower part. Accordingly, it is possible to reduce phenomena that, when the drone swiftly descends, or the drone is swiftly set, the frame 203 of the drone strongly fits the housing 801, and it becomes difficult for the frame 203 to be separated from the housing 801.

Similar to the first embodiment, also in the present embodiment, it is possible to correspond to drones of different sizes, by making the frame 203 of the drone generally similar to the inner shape of the cross-section of the frustum when seen from above, and making the frame 203 of the drone in an appropriate size according to the size of the drone.

Further, it is also possible to combine the other embodiments described above with the present embodiment. For example, luggage may be mounted on the drone, or a camera for monitoring, etc. may be arranged on the drone (see FIGS. 9A to 9C). Additionally, a loop (dummy loop) of a conductor as a magnetic shield for reducing radiated emission may be arranged on the drone (see FIGS. 12A and 12B). A dummy loop may be placed on the ground at a position surrounding the drone and the power transmission device (see FIGS. 13A and 13B). Other combinations are also possible.

Figure 19A:
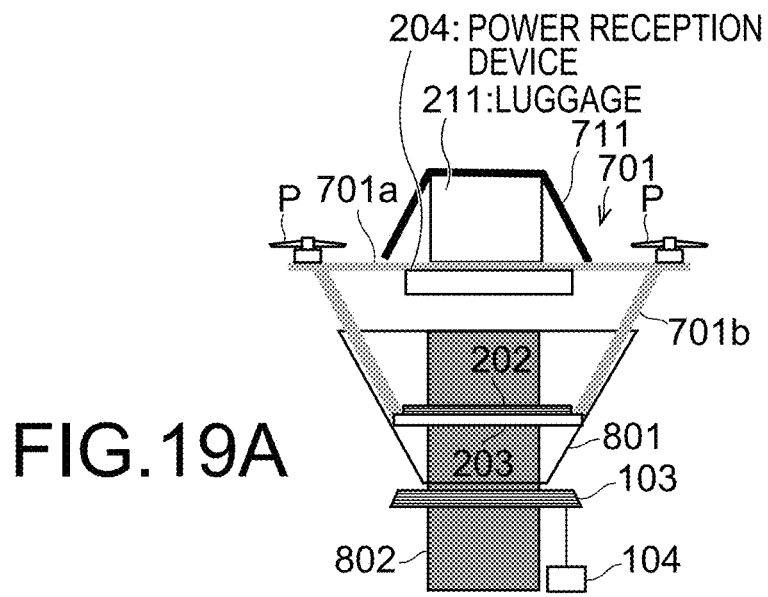
FIG. 19A is a diagram showing an example in which a luggage is placed.
Figure 19B:
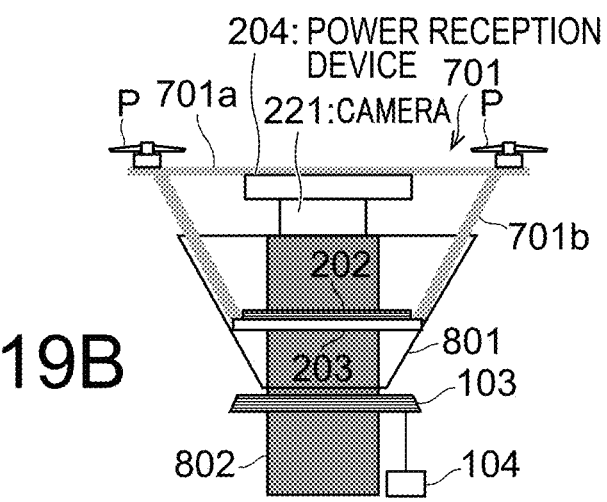
FIG. 19B is a diagram showing an example in which a monitoring camera is arranged.
Figure 19C:
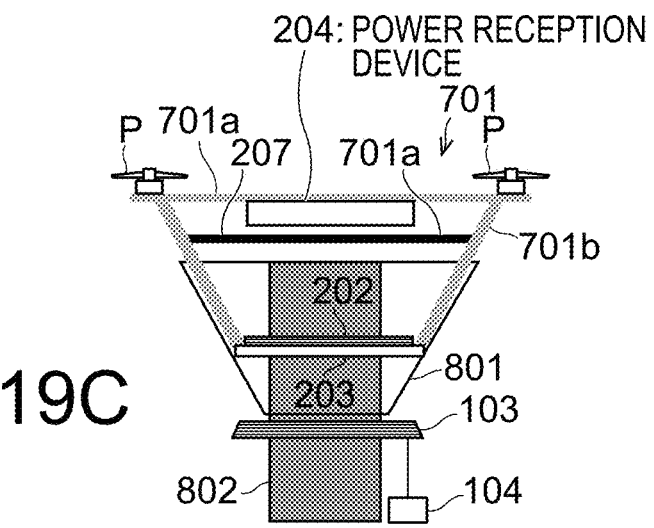
FIG. 19C is a diagram showing an example in which a dummy loop is arranged on a drone.

FIG. 19A shows an example in which luggage 211 is mounted. The luggage 211 is mounted on top plate 701a, and is fixed by a protect member 711, which is a non-conductive member such as plastic. The protect member 711 may cover the luggage 211 from all directions, or may cover from partial directions (the front-and-back direction, the left-and-right direction, or the like). FIG. 19B shows an example in which a camera 221 is arranged in the drone. The camera 221 is contained in the hollow part of the ferromagnetic material 802 at the time of landing of the drone. FIG. 19C shows an example in which a dummy loop 207 is arranged in the drone. The dummy loop 207 is arranged so as to be located above the ferromagnetic material 802 when the drone lands.

Twelfth Embodiment

Figure 20:
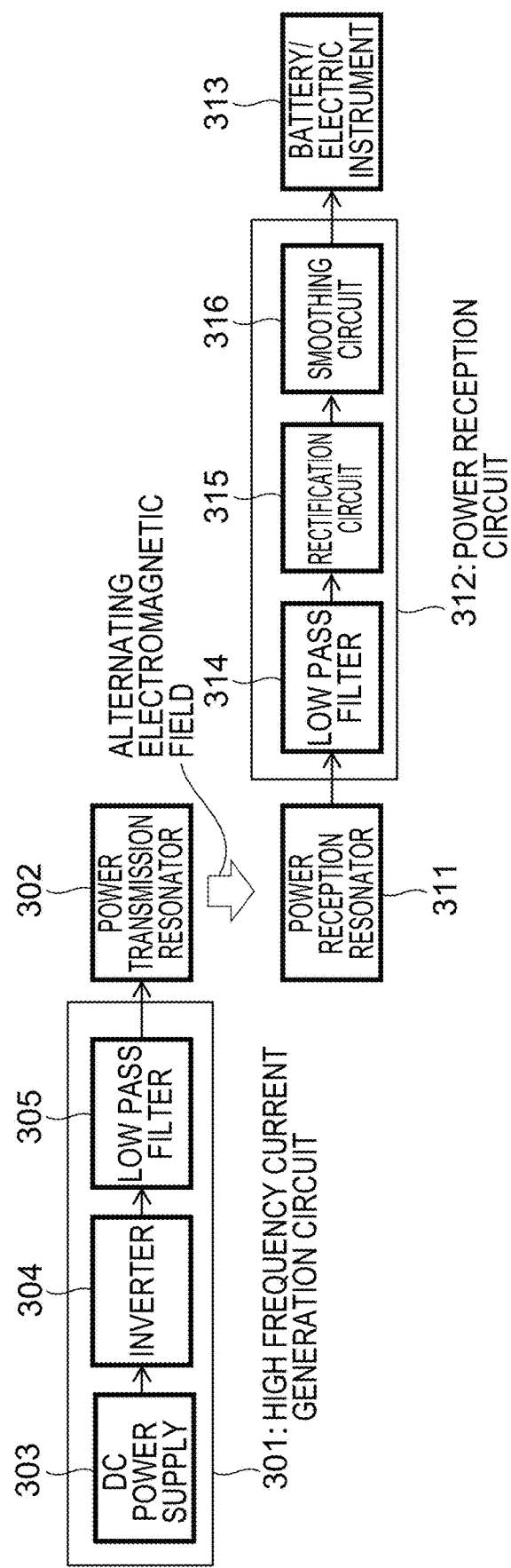
FIG. 20 is an electric block diagram of a wireless power transmission device according to a twelfth embodiment.

FIG. 20 shows an electric block diagram of a wireless power transmission device according to a twelfth embodiment. The configurations of the wireless power transmissions in the first to eleventh embodiments have the configuration in FIG. 20.

The configuration of a power transmission side includes a high frequency current generation circuit (power transmission circuit) 301 and a power transmission resonator 302. The power transmission circuit 301 includes a DC power supply 303 that generates a direct current power, an inverter 304 that generates an alternating current from the direct current power of the DC power supply 303, and a low pass filter 305. The low pass filter 305 includes, as an example, two inductors connected to each other in series, and a capacitor connected in parallel between these inductors. The low pass filter 305 reduces the harmonics of an output wave of the inverter 304, etc., and performs adjustment and conversion of the output impedance of the inverter 304 and the impedance of the power transmission resonator 302. The power transmission resonator 302 includes at least a power transmission coil (corresponding to the power transmission coil 103 in FIGS. 1A and 1B). Further, depending on the frequency used for power transmission, it is conceivable to provide at least one capacitor connected to the power transmission coil in series, in parallel, or in series parallel in order to make the resonance frequency with the power transmission coil close to the frequency used for power transmission. The power transmission coil of the power transmission resonator 302 generates an alternating electromagnetic field based on the alternating current that is input via the low pass filter 305, and made the generated alternating electromagnetic field to be coupled to a power reception coil of a power reception resonator 311 on the power reception side.

The configuration of a power reception side includes a power reception resonator 311, the power reception circuit 312, and a battery/electric instrument 313. The power reception resonator 311 includes at least a power reception coil (corresponding to the power reception coil 202 in FIGS. 1A and 1B). Further, depending on the frequency used for power transmission, it is conceivable to provide at least one capacitor connected to the power reception coil in series, in parallel, or in series parallel in order to make the resonance frequency with the power reception coil close to the frequency used for power transmission. The power reception resonator 311 receives a high frequency current with the power reception coil caused by electromagnetic induction by the power transmission coil via a near magnetic field. The power reception circuit 312 includes a low pass filter 314, a rectification circuit 315, and a smoothing circuit 316. The low pass filter 314 includes, for example, inductors connected to each other in series, and a capacitor connected in parallel between these inductors. The rectification circuit 315 rectifies an alternating current that is input from the low pass filter 314. The rectification circuit 315 is formed by, for example, a diode bridge of four diodes. The low pass filter 314 reduces the harmonic content reflected to the power reception resonator 311 side from the rectification circuit 315, and performs adjustment and conversion of the impedance with respect to the rectification circuit 315 and the subsequent circuit, and the impedance of the power reception resonator 311. A power signal rectified by the rectification circuit 315 is smoothed by the smoothing circuit 316, and is supplied to the battery/electric instrument 313. The smoothing circuit 316 is formed by, for example, a capacitor. A load is an electric instrument, such as a rechargeable battery or a motor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power transmission device comprising:
a housing for landing a vehicle, an outer shape of a cross-section of the housing being configured to become larger from a top of the housing toward a bottom of the housing, the outer shape being configured to be a non-true circle, and the outer shape being configured to be similar to an inner shape of a frame provided in the vehicle;
a ferromagnetic material within the housing, the ferromagnetic material being continuous in an up-and-down direction of the housing; and
a power transmission coil within the housing, the power transmission coil being configured to surround the ferromagnetic material.

2. The power transmission device according to claim 1, wherein the housing fits the frame in a first direction, wherein the inner shape of the frame generally matches the outer shape of the cross-section of the housing in the first direction.

3. The power transmission device according to claim 2, wherein the ferromagnetic material is surrounded by a power reception coil of the vehicle when the frame of the vehicle fits the housing.

4. The power transmission device according to claim 3, wherein when the frame fits the housing, the power transmission coil opposes to a conductive loop of the vehicle via the power reception coil and the ferromagnetic material is not surrounded by the conductive loop.

5. The power transmission device according to claim 1, wherein the outer shape of the cross-section of the housing is an ellipse, a rectangle of a non-regular polygon, or a shape formed by a straight line and a curved line.

6. The power transmission device according to claim 1, wherein the cross-sectional area of the ferromagnetic material becomes larger from the top of the housing toward the bottom of the housing.

7. The power transmission device according to claim 1, wherein the bottom of the housing has an opening, and the power transmission device further includes another ferromagnetic material,
the another ferromagnetic material is coupled to the ferromagnetic material via the opening, and
the another ferromagnetic material is configured to surround a the housing.

8. The power transmission device according to claim 7, wherein a shield member is formed on an outer side of the another ferromagnetic material, and
the shield member is configured to shield from magnetic fluxes.

9. The power transmission device according to claim 1, further comprising at least one of a first conductive loop and a second conductive loop,
wherein the first conductive loop is configured to surround the housing, and
the second conductive loop is arranged under the housing.

10. The power transmission device according to claim 1, wherein a mark for position alignment at landing of the vehicle or a part of the mark is formed on a surface of the housing.

11. The power transmission device according to claim 1, wherein the frame is formed in a hollow shape.

12. A power transmission device comprising:
a ferromagnetic material continuous in an up-and-down direction;
a housing for landing a vehicle, the housing being configured to surround an upper part of the ferromagnetic material, an inner shape of a cross-section of the housing being configured to become smaller from a top toward a bottom, the inner shape being configured to be a non-true circle, and the inner shape being configured to be similar to an outer shape of a frame provided in the vehicle; and
a power transmission coil configured to surround a lower part of the ferromagnetic material.

13. A vehicle comprising:
a non-metallic frame having an inner shape of a non-true circle, the inner shape being configured to be similar to an outer shape of a cross-section of a housing for landing the vehicle, the outer shape being configured to become larger from a top of the housing toward a bottom of the housing;

a power reception coil, wire of the power reception coil being wound along a shape of the frame; and a power reception device using power received by the power reception coil.

14. A wireless power transmission device comprising:

a non-metallic frame provided in a vehicle, an inner shape of the frame being configured to be non-true circle;

a housing for landing the vehicle, an outer shape of a cross-section of the housing being configured to become larger from a top of the housing toward a bottom of the housing, the outer shape being configured to be a non-true circle, and the outer shape configured to be similar to the inner shape of the frame;

a ferromagnetic material arranged in the housing, the ferromagnetic material being continuous in an up-and-down direction of the housing;

a power transmission coil arranged in the housing, the power transmission coil being configured to surround the ferromagnetic material;

a power transmission circuit configured to supply an alternating current to the power transmission coil;

a power reception coil, wiring of the power reception coil being wound along a shape of the frame; and a power reception device using power received by the power reception coil, wherein the housing fits the frame in a first direction, the inner shape of the frame generally matches the outer shape of the cross-section of the housing in the first direction, and the ferromagnetic material is surrounded by the power reception coil when the frame fits the housing.

\* \* \* \* \*